Patented Jan. 23, 1951

2,538,792

UNITED STATES PATENT OFFICE 2,538,792

PREPARATION OF PHENYLSERINOL

George W. Moersch, Detroit, Mich., assignor to Parke, Davis & Company, Detroit, Mich., a corporation of Michigan No Drawing. Application March 16, 1948, Serial No. 15,253

6 Claims. (Cl. 260—570.6)

This invention relates to a process for obtaining amino diols. More particularly, the invention relates to a process for obtaining amino diols of the formula,

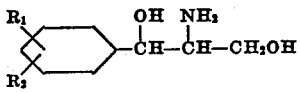

where $R_1$ and $R_2$ are the same or different substituents and represent hydrogen, lower alkyl and lower alkoxy radicals.

In accordance with the invention amino diols of the above general formula are obtained by reduction of a β-substituted α-amino-β-hydroxypropionic acid ester in an inert organic solvent at a temperature between about 20 and 125° C. with gaseous hydrogen under a pressure of 1000 to 8000 lbs. per sq. inch in the presence of a nickel hydrogenation catalyst. This transformation may be diagrammatically illustrated as follows:

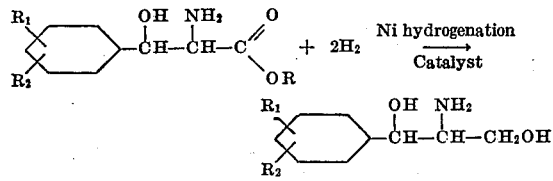

where R is a lower alkyl or aralkyl radical and $R_1$ and $R_2$ have the same significance as given above.

Although a number of different nickel hydrogenation catalysts can be used in the practice of the invention, the group of nickel catalysts known in the art as Raney nickel hydrogenation catalysts are preferred. This preferred class of nickel catalysts includes the conventional Raney nickel hydrogenation catalyst prepared from aluminum-nickel alloy by digestion with alkali at 115° C. or higher for about ten hours and the so-called "activated" Raney nickel catalysts prepared from aluminum-nickel alloy by digestion with alkali at lower temperatures and for shorter periods of time than used in the preparation of the conventional Raney nickel catalyst. In order to bring about the desired reaction it has been found that more than the customary catalytic amounts of the catalyst must be employed. In general, it is necessary to use from about 0.5 to 5 parts by weight of catalyst to each part by weight of ester. The optimal catalyst-ester weight ratio in most cases appears to be about 1.5 to 3 parts of catalyst to each part of ester and for economical commercial operation this catalyst-ester weight ratio is preferred.

Inert organic solvents which can be used for the reaction include lower aliphatic alcohols, lower aliphatic ethers and cyclic aliphatic ethers. Some examples of these solvents are methanol, ethanol, n-propanol, iso-propanol, diethyl ether, di-isopropyl ether, dibutyl ether, dioxane and the like.

The preferred temperatures and pressures for the reduction, of course, vary somewhat in the individual cases but, in general, lie in the range of from about 40 to 60° C. and about 2000 to 4000 lbs. per sq. in., respectively.

It will be appreciated by those skilled in the art that the products and starting materials of the invention exist in structural as well as optical isomeric forms. The term "structural" isomer or form as used herein refers to the cis or trans, that is, the planar relationship of the polar groups on the two assymmetric carbon atoms. To differentiate between these two possible diastereoisomeric forms the cis compounds will be referred to as the "regular" series or form and the trans compounds as the "pseudo" series or form. Such cis compounds are products wherein the two most highly polar of the groups on the two assymmetric carbon atoms lie on the same side of the plane of the two carbon atoms. Conversely, the trans or pseudo compounds are those wherein the two most highly polar groups lie on opposite sides of the plane of the two carbon atoms.

Both the regular and pseudo forms exist as racemates of optically active isomers which can be resolved into the dextro (d) and levo (l) rotatory isomers.

Because of the difficulty of representing these structural differences the customary structural formulae have been used herein but it is to be understood that these general formulae represent not only the complete racemate of both structural and optical isomeric forms but the individual isomers and the two optical racemates of the structural forms as well.

In carrying out the process of the invention neither the structural nor the optical form of the β-hydroxy amino acid esters undergoes any change and hence the amino diol products have the same structural configuration as the ester starting materials.

The amino diol compounds produced by the process of the invention are particularly useful as intermediates in the preparation of organic compounds possessing antibiotic activity. For example, the product of Example 1 can be converted to (1)-ψ-1-p-nitrophenyl-2-dichloroacetamidopropane-1,3-diol, a compound possessing outstanding and unique antibiotic properties, by the methods described in the co-pending application of Crooks et al., Serial No. 15,264, filed on even date herewith, now Patent No. 2,483,884, issued October 4, 1949.

The invention is illustrated by the following examples.

*Example 1*

A mixture consisting of 2.5 g. of (dl)-ψ-ethyl α-amino-β-hydroxy-β-phenylpropionate, 5 g. of Raney nickel hydrogenation catalyst [activated, for example, by the method described by Pavlic in J. Am. Chem. Soc., 68, 1471 (1946)] and 15 cc. of absolute ethanol in a hydrogenation bomb is shaken for two hours at 50° C. with gaseous hydrogen under a pressure of 2500 lbs. per sq. in. The bomb is cooled, vented and the catalyst removed from the contents by filtration. The unchanged ester in the filtrate is hydrolyzed by warming the filtrate with 200 cc. of 0.05 N sodium hydroxide in 1 to 1 aqueous acetone for a short time. The reaction mixture is neutralized, concentrated to a volume of about 50 cc. in vacuo and extracted with ethyl acetate. The ethyl acetate extracts are washed with dilute sodium bicarbonate solution, with water and then dried. Distillation of the ethyl acetate in vacuo yields the desired (dl)-ψ-1-phenyl-2-aminopropane-1,3-diol as a light yellow oil.

The amino diol product can be converted to its diacetate derivative in the following manner. A small amount of the oily (dl)-ψ-1-phenyl-2-aminopropane-1,3-diol is warmed on a steam bath with excess acetic anhydride for twenty minutes and then the reaction mixture poured into ice water. The solution is neutralized with sodium bicarbonate, extracted with ethyl acetate and the ethyl acetate extracts dried. Evaporation of the ethyl acetate yields the desired (dl)-ψ-1-phenyl-2-acetamido-3-acetoxypropane-1-ol which can be purified by recrystallization from ether or ethyl acetate; M. P. 168–9.5° C.

(dl)-ψ-1-phenyl-2-acetamidopropane-1,3-diol can be obtained by hydrolysis of the diacetate derivative. This is accomplished by dissolving the crude diacetate prepared above in 1 to 1 acetone-0.1 N sodium hydroxide solution, allowing the mixture to stand in an ice bath for an hour, neutralizing the solution and evaporating it to dryness. The crude product thus obtained is separated from the salt by extraction with ethyl acetate and purified by recrystallization from either ethyl acetate or ether, M. P. 130–2° C.

In a similar manner, by employing (1)-ψ-ethyl α-amino-β-hydroxy-β-phenylpropionate as the starting material in the above procedure one obtains (l)-ψ-1-phenyl-2-aminopropane-1,3-diol.

*Example 2*

A mixture consisting of 5 g. of (dl)-reg.-methyl α-amino-β-hydroxy-β-phenylpropionate, 10 g. of Raney nickel catalyst (prepared by the method referred to in Example 1) and about 35 cc. of absolute ethanol in a hydrogenation bomb is shaken for three hours at 60° C. with gaseous hydrogen under a pressure of 3000 lbs. per sq. in. The bomb is cooled, vented and the catalyst removed from the contents by filtration. The alcohol is distilled from the filtrate in vacuo and the residue warmed on a steam bath with 250 cc. of 0.1 N sodium hydroxide for about two hours in order to decompose any unchanged ester. The mixture is cooled, extracted with ethyl acetate, the extracts dried and the ethyl acetate distilled in vacuo. The residue consists of (dl)-reg.-1-phenyl-2-amino-propane-1,3-diol which can be purified, if desired, either by washing with chloroform followed by recrystallization or via one of its acyl derivatives.

*Example 3*

A mixture consisting of 5 g. of ethyl α-amino-β-hydroxy-β-(2-methylphenyl)propionate, 15 g. of Raney nickel hydrogenation catalyst (prepared by digesting a nickel-aluminum alloy at about 60° C. for slightly over one hour with alkali) and 50 cc. of methanol in a hydrogenation bomb is shaken for two and one-half hours at 55° C. with gaseous hydrogen under a pressure of 2800 lbs. per sq. in. The bomb is cooled, vented and the catalyst removed from the contents by filtration. The methanol is evaporated from the filtrate in vacuo and the residue refluxed for three hours with 25 cc. of 3 N hydrochloric acid. The reaction mixture is evaporated to dryness in vacuo, the residue taken up in a small amount of water and the solution made alkaline with sodium hydroxide solution. The solution is extracted with ethyl acetate, the extracts dried and the ethyl acetate removed by distillation in vacuo to obtain the desired 1-(2'-methylphenyl)-2-aminopropane-1,3-diol.

*Example 4*

A mixture consisting of 6 g. of (dl)-ψ-methyl α-amino-β-hydroxy-β-(3-methoxyphenyl) propionate, 9 g. of Raney nickel hydrogenation catalyst (prepared as described in Example 3) and 25 cc. of dioxane in a hydrogenation bomb is shaken for three hours at 50° C. with gaseous hydrogen under a pressure of about 3200 lbs. per sq. in. The bomb is cooled, vented and the catalyst removed from the contents by filtration. The dioxane is distilled from the filtrate under high vacuum and the residue refluxed for three hours with 35 cc. of 3 N hydrochloric acid in order to decompose any unchanged ester starting material. The reaction mixture is made alkaline in the cold with dilute sodium hydroxide solution, extracted with ethyl acetate and the extracts dried. Evaporation of the ethyl acetate from the extracts yields the desired (dl)-ψ-1-(3'-methoxyphenyl)-2-aminopropane-1,3-diol.

*Example 5*

A mixture consisting of 4 g. of (dl)-ψ-phenethyl-α-amino-β-hydroxy-β-(3,4-dimethylphenyl)-propionate, 8 g. of Raney nickel (prepared as described in Example 3) and 30 cc. of ethanol in a hydrogenation bomb is shaken for three hours at 55° C. with gaseous hydrogen under a pressure of 4000 lbs. per sq. in. The bomb is cooled, vented and the catalyst removed from the contents by filtration. The ethanol is distilled from the filtrate in vacuo and any unchanged ester starting material present in the residue hydrolyed by refluxing the residue for three hours with 25 cc. of 3 N hydrochloric acid. The cool reaction mixture is made alkaline with sodium hydroxide solution and extracted with ethyl acetate. The extracts are dried and the ethyl acetate distilled to obtain the desired (dl)-

ψ-1-(3′,4′-dimethylphenyl)-2-aminopropane-1,3-diol.

Example 6

A mixture consisting of 4 g. of methyl α-amino-β-hydroxy-β-(2-methyl-4-ethoxyphenyl) propionate, 8.8 g. of Raney nickel (prepared by the method referred to in Example 1) and 30 cc. of di-isopropyl ether in a hydrogenation bomb is shaken for two hours at 60° C. with gaseous hydrogen under a pressure of 2500 lbs. per sq. in. The bomb is cooled, vented and the catalyst removed from the contents by filtration. The di-isopropyl ether is removed from the filtrate by distillation in vacuo and the residue heated under reflux for three hours with about 250 cc. of 0.1 N sodium hydroxide solution in order to decompose any unchanged ester starting material. The mixture is cooled, the pH adjusted to about 10 and extracted with ethyl acetate. The ethyl acetate extracts are dried and the ethyl acetate distilled to obtain the desired 1-(2′-methyl-4′-ethoxyphenyl)-2-aminopropane-1,3-diol.

The β-substituted α-amino-β-hydroxypropionic acid esters used as starting materials in the practice of the invention may be prepared by condensing benzaldehyde or the corresponding $R_1$, $R_2$-substituted benzaldehyde with amino acetic acid and esterifying the α-amino-β-hydroxy-β-phenyl (or substituted phenyl) propionic acid so produced with a lower aliphatic or araliphatic alcohol.

What I claim as my invention:

1. Process which comprises reducing a β-substituted α-amino-β-hydroxypropionic acid ester of formula,

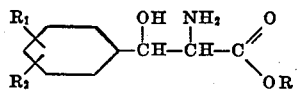

in an inert organic solvent at a temperature between about 20 and 125° C. with gaseous hydrogen under a pressure of 1000 to 8000 lbs. per sq. in. in the presence of 0.5 to 5 parts by weight of a nickel hydrogenation catalyst thereby obtaining an amino diol of formula,

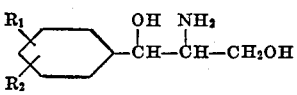

where R is a member of the class consisting of lower alkyl and aralkyl radicals and $R_1$ and $R_2$ are members of the class consisting of hydrogen, lower alkyl and lower alkoxy radicals.

2. Process which comprises reducing a β-substituted α-amino-β-hydroxypropionic acid ester of formula,

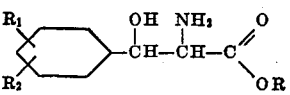

in an inert organic solvent at a temperature between about 40 and 60° C. with a gaseous hydrogen under a pressure of about 2000 to 4000 lbs. per sq. in. in the presence of 1.5 to 3 parts by weight of a Raney nickel hydrogenation catalyst thereby obtaining an amino diol of formula,

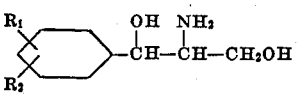

where R is a member of the class consisting of lower alkyl and aralkyl radicals and $R_1$ and $R_2$ are members of the class consisting of hydrogen, lower alkyl and lower alkoxy radicals.

3. Process which comprises reducing a β-substituted α-amino-β-hydroxypropionic acid ester of formula,

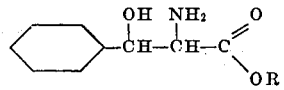

in an inert organic solvent at a temperature between about 20 and 125° C. with gaseous hydrogen under a pressure of 1000 to 8000 lbs. per sq. in. in the presence of 0.5 to 5 parts by weight of a nickel hydrogenation catalyst thereby obtaining an amino diol of formula,

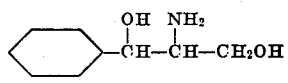

where R is lower alkyl.

4. Process which comprises reducing a β-substituted α-amino-β-hydroxypropionic acid ester of formula,

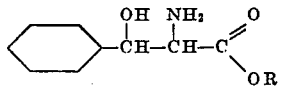

in an inert organic solvent at a temperature between about 40 and 60° C. with gaseous hydrogen under a pressure of about 2000 to 4000 lbs. per sq. in. in the presence of 1.5 to 3 parts by weight of a Raney nickel hydrogenation catalyst thereby obtaining an amino diol of formula,

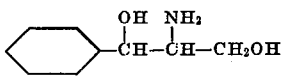

where R is lower alkyl.

5. Process which comprises reducing a (dl)-ψ-α-amino-β-hydroxy-β-phenylpropionic acid lower alkyl ester in an inert organic solvent at a temperature between about 20 and 125° C. with gaseous hydrogen under a pressure of 1000 to 8000 lbs. per sq. in. in the presence of 0.5 to 5 parts by weight of a nickel hydrogenation catalyst thereby obtaining (dl)-ψ-1-phenyl-2-aminopropane-1,3-diol.

6. Process which comprises reducing a (dl)-ψ-α-amino-β-hydroxy-β-phenylpropionic acid lower alkyl ester in an inert organic solvent at a temperature between about 40 and 60° C. with gaseous hydrogen under a pressure of about 2000 to 4000 lbs. per sq. in. in the presence of 1.5 to 3 parts by weight of a Raney nickel hydrogenation catalyst thereby obtaining (dl)-ψ-1-phenyl-2-aminopropane-1,3-diol.

GEORGE W. MOERSCH.

REFERENCES CITED

The following references are of record in the file of this patent:

UNITED STATES PATENTS

| Number | Name | Date |
|---|---|---|
| 2,103,266 | Lott | Dec. 28, 1937 |

FOREIGN PATENTS

| Number | Country | Date |
|---|---|---|
| 200,996 | Switzerland | July 21, 1937 |
| 844,225 | France | July 20, 1939 |

OTHER REFERENCES

Ovakimian et al.: Jour. Biol. Chem., vol. 135, pp. 91–98 (1940).

Nystrom et al.: J. A. C. S., vol. 69, pp. 2548–2549.